United States Patent [19]

Sugimoto et al.

[11] Patent Number: 4,964,702
[45] Date of Patent: Oct. 23, 1990

[54] LIQUID CRYSTAL DISPLAY DEVICE HAVING A LIGHT SHIELDING LAYER BEING A COMPLEMENTARY COLOR TO THE COLOR FILTER

[75] Inventors: Yoshio Sugimoto, Yokohama; Ryujiro Muto, Nishinomiya; Takeji Arakaki, Amagasaki, all of Japan

[73] Assignee: Asahi Glass Company, Ltd., Tokyo, Japan

[21] Appl. No.: 326,649

[22] Filed: Mar. 21, 1989

[30] Foreign Application Priority Data

Mar. 24, 1988 [JP] Japan .................................. 63-68245

[51] Int. Cl.$^5$ ............................................... G02F 1/13
[52] U.S. Cl. ............................. 350/339 R; 350/339 F; 350/337
[58] Field of Search ................ 350/339 R, 337, 340, 350/339 F, 334

[56] References Cited

U.S. PATENT DOCUMENTS

| | | | |
|---|---|---|---|
| 4,552,437 | 11/1985 | Gantenbrink et al. | 350/339 R |
| 4,591,240 | 5/1986 | Masaki et al. | 350/339 R |
| 4,601,546 | 7/1986 | Ohta | 350/339 F |
| 4,653,862 | 3/1987 | Morozumi | 350/339 F |
| 4,810,060 | 3/1989 | Ukai | 350/339 R X |
| 4,836,652 | 6/1989 | Oishi et al. | 350/334 |

FOREIGN PATENT DOCUMENTS 61-112129 5/1986 Japan .

Primary Examiner—Stanley D. Miller
Assistant Examiner—Huy K. Mai
Attorney, Agent, or Firm—Oblon, Spivak, McClelland, Maier & Neustadt

[57] ABSTRACT

A liquid crystal display device of negative display type comprises a liquid crystal cell comprising a nematic liquid crystal layer sandwiched between substrates provided with electrodes, a color filter and a light shielding layer, which is in a relation of complementary color to the color filter, covering other than the area corresponding to a display pattern, a pair of polarizing films arranged at both surfaces of the liquid crystal cell, and a driving means for applying a voltage to the electrodes. The driving means may be so adapted to apply a voltage sufficient to energize the nematic liquid crystal to the electrodes for the area of display pattern other than a desired display pattern.

13 Claims, 1 Drawing Sheet

LIQUID CRYSTAL DISPLAY DEVICE HAVING A LIGHT SHIELDING LAYER BEING A COMPLEMENTARY COLOR TO THE COLOR FILTER

BACKGROUND OF THE INVENTION

1. Field of the Invention

The present invention relates to a liquid crystal display device of negative display type having a light shielding layer formed therein.

2. Discussion of Background

Heretofore, a negative display wherein characters or patterns are displayed brightly on a dark display surface has been used in many cases for liquid crystal display devices used for the display portions of watches or meters for automobiles.

In a negative liquid crystal display device, no voltage is applied to the liquid crystal layer at the background area other than a display area and liquid crystal molecules are twisted at the background area, whereby light propagates along the twisted liquid crystal molecules, and a pair of polarizing films are disposed with their polarization axes being in parallel with each other so that no light is transmitted at the background area.

However, the negative liquid crystal display device had a problem that polarization efficiency reduces when light propagates in a twisted fashion, light having a certain color is transmitted to some extent, whereby there is caused insufficient contrast at the background area.

In order to resolve the above-mentioned problems, it has been proposed to form a light shielding layer at the background area other than a display portion.

In many cases, the light shielding layer is formed inside the cell in order to avoid such a phenomenon that the display pattern is deviated from the pattern of the light shielding layer when seen from an oblique direction.

When the light shielding layer is made of a metallic film, the thickness of the layer can be small and a high light shielding properties can be obtained. However, since the metallic film has electric conductivity, it is necessary to provide a complete insulation means between the electrodes and the light shielding layer so as not to cause short-circuitting between the electrodes. However, it is difficult to obtain a thin insulating layer having a large surface area without any pin-hole, and there is a possibility of short-circuitting between neighboring electrodes. In order to eliminate the above-mentioned problem, there has been known to form a light shielding layer of a thick film by a printing method or the like. In this case, there is no risk of short-circuitting between the neighboring electrodes even by using ink in which electric conductive particles such as carbon are used as a pigment. However, the thickness in average of the light shielding layer is large such as 2 $\mu$m-5 $\mu$m. Accordingly, a problem of short-circuitting between the substrates arises. In order to eliminate such disadvantage, use of ink including a non-conductive pigment is proposed.

Use of the ink including the non-conductive pigment reduces the problem of short-circuitting between the neighboring electrodes and between the substrates. However, when a light shielding layer was formed at the background area with use of the ink including the non-conductive pigment to thereby obtain high light shielding function, it was necessary to form a thicker light shielding layer in comparision with the case that the light shielding layer was formed by using ink in which electric conductive particles such as carbon particles are used as the pigment. In this case, it is difficult to provide a uniform cell gap, and unevenness of color or misalignment of the substrates apt to occur. Further, a part of the cell gap is extremely narrowed, and the liquid crystal can not smoothly introduced into the cell.

SUMMARY OF THE INVENTION

It is an object of the present invention to provide a liquid crystal display device having a reduced thickness and free from unevenness of color and misalignment.

In accordance with the present invention, there is provided a liquid crystal display device of negative display type, which comprises a liquid crystal cell comprising a nematic liquid crystal layer sandwiched between substrates provided with electrodes, a color filter attached to one of the substrates and a light shielding layer covering other than the area corresponding to a display pattern, the light shielding layer being in a relation of complementary color to the color filter, a pair of polarizing films arranged at both surfaces of the liquid crystal cell, and a driving means for applying a voltage to the electrodes.

In accordance with the present invention, there is provided a liquid crystal display device of negative display type, which comprises a liquid crystal cell comprising a nematic liquid crystal layer sandwiched between substrates provided with electrodes, a color filter and a light shielding layer covering other than the area corresponding to a display pattern, the light shielding layer being in a relation of complementary color to the color filter, a pair of polarizing films arranged at both surfaces of the liquid crystal cell to permit light from a no voltage-applied portion to pass through the polarization axes, and a driving means for applying a voltage to the electrodes, whereby a voltage sufficient to energize the nematic liquid crystal is applied to the electrodes for the area of a display pattern other than a desired display pattern.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Preferred embodiments of the liquid crystal display device of the present invention will be described with reference to the drawings.

Figure 1:
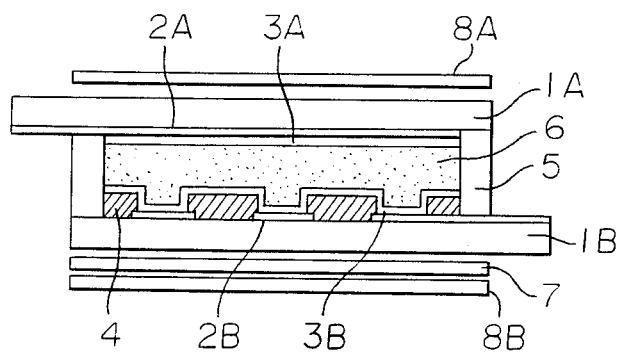
FIG. 1 is a cross-sectional view of a typical example of the liquid crystal display device of negative display type according to the present invention.

FIG. 1 is a cross-sectional view of a typical embodiment of the twisted nematic liquid crystal display device of negative display type. In FIG. 1, a reference numeral 1A designates a substrate, a numeral 2A designates an electrode formed on the substrate 1A, and an orientation layer 3A is formed on the electrode 2A.

On the other hand, on a substrate 1B, an electrode 2B, a light shielding layer 4 and an orientation layer 3B are respectively formed in this order wherein the light shielding layer 4 is formed at the area other than a display pattern. A liquid crystal cell is formed by arranging the two substrates with the electrodes facing each other, sealing the side portions of the substrates by a sealing material 5 and forming a liquid crystal layer 6 by filling a nematic liquid crystal between the substrates.

It is desirable that the product $\Delta n \cdot d$ of the thickness (d) of the liquid crystal layer and the optical anisotropy ($\Delta n$) of liquid crystal is in a range of from 0.3 $\mu$m–1.0 $\mu$m in order to reduce angular dependency in contrast and to increase a light transmittance in a transparent segment portion.

A color filter 7 is provided at an inner surface or an outer surface of the liquid crystal cell. In the present invention, the color filter 7 is provided not only at the area of display pattern but also at the entire surface.

The light shielding layer 4 is in a relation of complementary color to the color filter 7.

A pair of polarizing films 8A, 8B are arranged on both surfaces of the liquid crystal cell.

The substrates used for the present invention may be a transparent substrates made of a material such as glass or plastic, and a transparent electrode made of a material such as ITO ($In_2O_3$—$SnO_2$) or $SnO_2$. Metallic lead wires of a low resistance may be connected to the transparent electrodes, or the color filter and/or an insulating layer may be formed on or below the transparent electrodes.

It is preferable that the color filter is formed outside the cell since it is usually formed at the entire surface although the color filter may be formed inside the cell.

The relationship of the color filter to the light shielding layer is as follows. Since a mixed color of the color filter and the light shielding layer is observed at the background area, the light shielding layer should be a complementary color with respect to the color filter. In this case, a thin dark or black light shielding layer having the same light shielding properties as a case that a dark or black light shielding layer having a normal thickness is used is obtainable.

The relation of complementary color should be such that when a single light shielding layer is used, it permits only light showing a specified color to pass therethrough in the same manner as a dark color filter; when light is passed through the light shielding layer and the color filter which are in an overlapping state, they show substantially a dark or black color, and light is interrupted over the entire region of visible light. For instance, when a green color filter is used, a light shielding layer of a redish purple series color which intercepts light of a green color may be used; when a red color filter is used, a light shielding layer of a bluish green series color which intercepts a red color may be used, and when a yellow color filter is used, a light shielding layer of a bluish color which intercepts an yellow color may be used.

Color practically used for the light shielding layer in the present invention can be experimentally determined so that a light transmittance is reduced or light is intercepted over the entire region of visible light when the color of the light shielding layer is overlaid on the pattern of absorption spectrum of the color filter. Accordingly, if the absorption of color by a conventional color filter is not taken into account, the thickness of the light shielding layer can be reduced in comparison with such case of the above-mentioned example, e.g. a use of a dark or black film formed by mixing a pigment of green, red, blue or yellow. Of course, it is difficult to obtain a complete complementary color in the abovementioned case. Although the light shielding layer and the color filter without having complete complementary color are usable in the present invention, the thickness of light shielding layer can not be reduced as much. The above-mentioned relation of complementary color can be applied to a case that a display in plural kinds of color is desired at the display pattern portion. In this case, color of light shielding layer may be selected so that it is seen to be dark or black with respect to any kind of display color. In such case, the color filter may be provided at the outer and inner parts of the cell. For instance, two kinds of color of yellow and green can be displayed by arranging an yellow color filter on the entire surface of the outside portion and by arranging a blue color filter at a part of the inner portion of the cell. In this case, the light shielding layer should be in a relation of complementary color to the yellow color filter provided on the entire surface of the outside portion of the cell.

The light shielding layer of the present invention may be formed on the inner surface of the liquid crystal cell or on the outer surface thereof, and its light transmittance is adjusted to be in a range from 0.02 to 2.0% in an assembled state with the color filter. In this case, it is desirable that the light transmittance is compensated to be 5.0% or less in any wavelength region of the entire visible light region. It is much preferred to form the light shielding layer on the inner surface of the liquid crystal cell, since a positional displacement between the display pattern and the light shielding layer is less likely when observed from an oblique direction.

The light shielding layer is formed at the background area of the display and may usually be formed on one of the substrates. It may be divided and formed on the both substrates, however, it is advantageous to form it only one of the substrates, since the process steps may thereby be reduced in number and the productivity is increased.

A conventional layer for color filter, irrespective of a thin layer or a thick layer, can be used for the light shielding layer. It is much preferred that ink having a specified color such as ink containing a nonconductive pigment is used to impart a relation of complementary color to the color filter and a mixture including the ink of a specified color is formed by means of a printing method. In consideration of the color temperature of an illumination means to be used, it is desirable to determine the color of the light shielding layer so that the background area exhibits a dark or black color.

An orientation layer is formed on a surface of the substrates with the electrodes. When the light shielding layer is formed on the electrode, the orientation layer is formed on the light shielding layer. As a method of controlling the orientation, there is available a method of forming an organic polymer film such as polyimide, polyamide or polyvinyl alcohol by means of a printing method or a spinner method followed by rubbing, or an oblique deposition method.

It is preferable that the orientation which controls the direction with respect to the orientation layers is 90°. However, they may be arranged by deflecting when at an angle in a range of 50°–120° in order to increase a contrast ratio when viewed from an oblique direction.

Further, an insulating film such as $SiO_2$, $TiO_2$ and so on may be interposed between the orientation layer and the light shielding layer or the electrode in order to improve insulating properties.

The sealing material may be a usual sealing material such as an epoxy resin or a silicone resin. It is usual to provide an opening at a part of the sealing material, and after assembling a cell, the liquid crystal is injected from the opening followed by sealing it.

The liquid crystal to be injected may be added with a small amount of chiral compound in order to avoid the misalignment, so called "Reverse twist", of the liquid crystal. However, when a twist angle which is determined by the direction of alignment is smaller than 90°, the liquid crystal without including the chiral compound may be used.

The polarization axes of the pair of polarizing films may be arranged in parallel to each other in the same manner as the ordinary liquid crystal display device of negative display type. Or, they may be so arranged as to cross at substantially a right angle in the same manner as the ordinary liquid crystal display device of the positive display type. In the later case, the portion where voltage is applied becomes dark or black. Accordingly, it is necessary to use a driving method in which no voltage is applied to picture elements which are intended to be bright and a voltage is applied to picture elements which are intended to be dark, this method is opposite to the driving of usual liquid crystal display device of the negative display type. In such liquid crystal display device, a high contrast ratio such as 1/1,000 or more can be easily obtained since the light shielding degree at the dark portion is higher than the that of the ordinary liquid crystal display device of negative display type.

When the display device is mainly viewed from the front direction, the polarization axes should be crossed at a right angle. However, when the device is mainly viewed from an oblique direction and the contrast ratio in the case of being viewed from that direction is to be increased, it is desirable that the polarization axes are arranged with some amount of shifting by an angle of 1°-10° from the perpendicularly crossing state.

As the driving means for applying the voltage to the electrodes, one used for the ordinary liquid crystal display device is available. Usually, a driving means capable supplying an a.c. voltage at equal to or higher than a threshold value may be used.

The substrates may be made of polarizing film substrates. A touch switch, an ultraviolet cutting filter, or an antireflective filter may be laminated on the outer surface of each of the substrates. A usual technique commonly employed for the liquid crystal display device may be applied so long as it does not adversely affect the effect of the present invention.

The present invention is applicable to the ordinary liquid crystal display device of negative display type; however, when the present invention is applied to such liquid crystal display device that as a whole, it is of a negative display type, but the application of a voltage to the electrodes is conducted by a driving means in the same manner as in the case of a positive display type, and a pair of polarizing films are arranged so that the polarization axes are crossed at a right angle, it provides a greater effect. Namely, no electric field or a voltage lower than a threshold value which causes liquid crystal molecules to be vertically aligned is applied to the picture elements to pass light therethrough in the display portion, and a voltage higher than the threshold value is applied to the light shielding picture elements. Application of the voltage may be conducted by separately driving the picture elements or by using a multiplex driving system in which a plurality of picture elements are driven by a common signal.

As to a voltage used for driving the picture elements, it is so selected that a high contrast can be provided at an angle which is supposed to be mainly used for observation. In general, a high contrast is obtainable at a large angle (with respect to the normal direction to the substrates) when a higher voltage is used. When they are actuated by a low voltage, a high contrast is obtainable at a low angle. However, when a voltage to be applied is too low, a sufficient contrast can not be obtained. Generally, it is desirable to actuate the liquid crystal molecules by a voltage in a range of from 1.5 times to 6 times as high as the threshold voltage applied to the normal direction to the substrates.

An illuminating means is usually provided behind the rear side polarizing film. However, a reflecting plate may be provided behind the rear side polarizing film so as to display by utilizing light from the front side. Further, the present invention is applicable to a device in which an illuminating means and a half mirror are provided so as to utilize light coming from both of the rear side and the front side.

A further high contrast is obtainable in a wide range of viewing angle by incorporating a negative type or a positive type dichloric dye of dark or black color, or dark or black color in a mixing state, in the liquid crystal. Further, it is possible to reduce angle dependency in contrast by disposing a suitable element having an optical anisotropy between a pair of polarizing films.

In the present invention, in which the light shielding layer is in a relation of complementary to the color filter, when light passes through both the light shielding layer and the color filter, the background area is seen as if it has a dark or black light shielding layer. In this case, the thickness of the light shielding layer can be reduced in comparision with the case that a dark or black light shielding layer is used, since the layer does not contain a pigment for exhibiting color in the color filter. Accordingly, the unevenness of color or the misalignment do not take place, and the injection of the liquid crystal can be easy.

The light shielding layer may include a pigment other than the pigment which has a relation of complementary color to the color filter in a strict sense. In this case, the purpose of the present invention is satisfied when the light shielding layer is sufficiently dark or black. However, the thickness of the light shielding layer is apt to increase.

EXAMPLE 1

A liquid crystal display device was prepared as follows. A glass substrate with ITO was subjected to patterning operations, and a redish purple light shielding layer having a thickness of 1.2 μm was formed inside a cell except the portion corresponding to a display pattern by using ink formulated by red, blue and purple by an offset printing method. A film of polyimide of a thickness of 0.1 μm was formed on the light shielding layer. A segment electrode substrate was prepared by rubbing the polyimide layer to form an orientation layer.

Glass substrate with ITO was subjected to patterning. A polyimide film having a thickness of 0.1 μm was formed on the glass substrate. Then, rubbing operations were conducted to the polyimide film to thereby form an orientation layer so that a common electrode substrate was prepared.

The segment electrode substrate and the common electrode substrate were arranged so as to face their electrode surfaces. A sealing material was used to seal the side portions of the substrates. A nematic liquid crystal was injected inside the sealed product to prepare a liquid crystal cell.

A plate-like green color filter was disposed at the rear side surface of the liquid crystal cell, and a pair of polarizing films were attached to both surfaces of the cell. Then, an illuminating means was disposed in back of one of the polarizing films.

Figure 2:
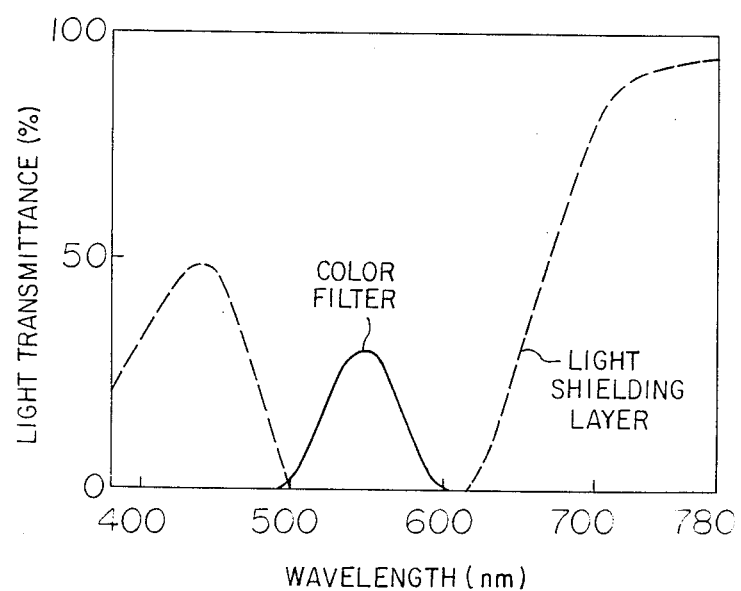
FIG. 2 is a diagram showing light transmittance characteristics of a green color filter and a redish purple light shielding layer used in combination as in Example 1.

FIG. 2 shows the light transmittance characteristics obtained by using the green color filter and the redish purple light shielding layer. In FIG. 2, the solid line represents the light transmittance characteristic of the green color filter which shows transmittance of the wavelength of about 500 nm–600 nm. On the other hand, the broken line represents the light transmittance characteristic of the redish purple light shielding layer which shows completely interseption of the wavelength of the about 500 nm–600 nm.

As is clear from the light transmittance characteristics, light could be absorbed over the entire region of wavelength by overlaying the green color filter and the redish purple light shielding layer; thus a light transmittance of 0.05% was obtained, and the same dark tone or black color as in the case that a dark or black light shielding layer was formed was obtained as well as highly efficient light shielding properties. A mixed ink of dark tone which is prepared by mixing the ordinary red, blue and yellow colors may be used instead of the mixed ink of red, blue and purple. In this case, the thickness of the color filter had to be about 2.4 $\mu$m in order to reduce the light transmittance to 0.05% or less. Whereas according to the embodiment of the present invention, the thickness of the layer could be reduced to half in comparison with the thickness in the conventional product, and accordingly, the steps of printing in number could be reduced to about half and productivity was increased. Further, in the embodiment of the present invention, since the thickness of layer was thin, it did not adversely affect the control of the gap between the substrates, and the reject rate due to uneven gap between the substrates was decreased.

The liquid crystal display device of this embodiment was prepared in such a manner that the polarization axis of one of the polarizing films is crossed at a right angle to the direction of orientation of the adjacently provided other substrate, namely, the polarization axes of the paired polarizing films extend in parallel to each other. Then, the display device was driven in the same manner as the ordinary liquid crystal display device of negative display type. Then, the liquid crystal display device of negative display type having sufficiently dark background area was obtained.

Then, the liquid crystal display device of this embodiment was so arranged that the polarization axes of the pair of polarizing films are crossed at a right angle to the direction of orientation of the adjacent substrates, namely, the polarization axes of the pair of polarizing films are crossed perpendicularly each other. The liquid crystal display device was driven by using a driving method contrary to the method of driving the ordinary liquid crystal display device of negative display type i.e. a voltage is not applied to picture elements which are intended to make then bright and a voltage is applied to picture elements which are to be dark. With such arrangement and the method of driving, the light shielding degree was high at the dark portion corresponding to the display pattern in comparison with the ordinary liquid crystal display device of negative display type, and accordingly, darkness in the background area effectively functioned and a high contrast ratio was obtained.

EXAMPLE 2

A liquid crystal cell was prepared in the same manner as Example 1 except that a red color filter was used and a bluish green series light shielding layer which intersepts red color was used, and a liquid crystal display device was prepared. The same effect could be obtained by the liquid crystal diaplay device as that of Example 1.

In accordance with the liquid crystal display device of the present invention, the color filter is provided and the light shielding layer is so adapted to be in a relation of complementary color to the color filter, whereby the thickness of the light shielding layer can be reduced in comparison with a case that a dark or black light shielding layer is used.

The liquid crystal display device of the present invention provides advantages as follows. The number of printing times for preparing the light shielding layer can be reduced, whereby steps for forming the layer can be simplified and processability is improved. Further, uneven surfaces of the light shielding layer can be eliminated, ununiformity of color due to uneven gap between the substrates or misalignment can be reduced. Moreover, since the cell gap at the light shielding layer can be broaden, the liquid crystal can be smoothly injected to thereby shorten a time of filling the liquid crystal whereby occurrence of bubbles can be suppressed.

In the present invention, since the light shielding layer is in a relation of complementary color to the color filter, the portion to be lit (to be transmitted) in the display pattern is clearly distinguishable in an apparent view. Further, by arranging the polarization axes of the pair of polarizing films so as to cross at a right angle and by using a driving method contrary to the driving method for the ordinary liquid crystal display device of negative display type, i.e. a voltage is not applied to the picture elements which are to be bright and a voltage is applied to the picture elements which are to be dark, a high contrast ratio such as a ratio of 1 to several hundreds or more, which could not be obtained by the conventional liquid crystal display device of negative display type, can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display device of negative display type, which comprises:
    a liquid crystal cell comprising a nematic liquid crystal layer sandwiched between substrates provided with electrodes, a color filter placed outside said substrates and a light shielding layer placed between said substrates and covering the area, other than the area corresponding to a display pattern, wherein said light shielding layer is a complementary color to said color filter,
a pair of polarizing films arranged at both surfaces of said liquid crystal cell, and
a driving means for applying a voltage to said electrodes.

2. The liquid crystal display device according to claim 1, wherein said color filter and said light shielding layer exhibit a dark or black color when they are in an overlapping state.

3. The liquid crystal display device according to claim 1, wherein an illuminating means is provided outside one of said polarizing films.

4. The liquid crystal display device according to claim 1, wherein said color filter has a green color and said light shielding layer has a redish purple color.

5. The liquid crystal display device according to claim 1, wherein said color filter has redish color and said light shielding layer has a bluish green color.

6. The liquid crystal display device according to claim 1, wherein said color filter has a yellow color and said light shielding layer has a bluish color.

7. The liquid crystal display device according to claim 1, wherein the light transmittance of said color filter and said light shielding layer when they are overlapping is in a range from 0.02% to 2.0%.

8. A liquid crystal display device of negative display type, which comprises:
a liquid crystal cell comprising a nematic liquid crystal layer sandwiched between substrates provided with electrodes, a color filter and a light shielding layer covering other than the area corresponding to a display pattern, said light shielding layer being a complementary color to said color filter,
a pair of polarizing films arranged at both surfaces of said liquid crystal cell to permit light from a no voltage-applied portion to pass through the polarization axes, and
a driving means for applying a voltage to said electrodes, whereby a voltage sufficient to energize said nematic liquid crystal is applied to said electrodes for the area of a display pattern other than a desired display pattern.

9. The liquid crystal display device according to claim 8, wherein said liquid crystal cell and said polarizing films are so arranged that the direction of orientation of said substrates with respect to each other is in a range from 50° to 120°, and said polarization axes of said two polarizing films are crossed at an angle ranging from 80° to 100°.

10. The liquid crystal display device according to claim 9, wherein said liquid crystal cell and said polarizing films are so arranged that the direction of orientation of said substrates with respect to facing each other is 90°, and said polarization axes of said two polarizing films are crossed at an angle of 90°.

11. The liquid crystal display device according to claim 8, wherein said color filter and said light shielding layer show a dark or black color where they are overlapping.

12. The liquid crystal display device according to claim 8, wherein said color filter is provided outside said substrate and said light shielding layer is provided between said substrates.

13. The liquid crystal display divice according to claim 8, wherein an illuminating means is provided outside one of said polarizing films.

* * * * *